United States Patent

[11] 3,578,170

[72] Inventor Ken-Ichiro Kurita
    36-4, 5-chome, Senriyama-nishi, Suita,
    Osaka Drefecture, Japan
[21] Appl. No. 2,267
[22] Filed Jan. 12, 1970
[45] Patented May 11, 1971

[54] APPARATUS FOR DETECTING INCLINATION OF FILTER PLATES IN TRANSIT
    4 Claims, 7 Drawing Figs.
[52] U.S. Cl. .................................................. 210/230
[51] Int. Cl. .............................................. B01d 25/00
[50] Field of Search .......................................... 210/91,
                                            225, 230, 236; 100/198

[56] References Cited
    UNITED STATES PATENTS
    3,093,578  6/1963  Hofmeister ................... 210/91
    3,204,769  9/1965  Davis ........................... 210/230
    3,232,435  2/1966  Fismer .......................... 210/230
    3,295,437  1/1967  Fowler .......................... 210/230X Primary Examiner—Reuben Friedman
Assistant Examiner—T. A. Granger
Attorney—McCarthy, Depaoli, O'Brien & Price ABSTRACT: A prevention apparatus is for use in a filter press provided with a group of filtering elements supported between a stationary end plate and a movable end plate and adapted to be released horizontally for the removal of cake or to be compressed together for filtration. Disposed at least along one side of the group of filtering elements is a detecting line employing a light beam, lead wire or wire rope which has linearity in parallel with the direction of movement of the filtering elements. A blocking member is mounted on each of the filtering elements in corresponding relationship with the detecting line. When the filtering element is inclined due to some trouble during transit, the detecting line is interfered with by the blocking member to halt the transport of the filtering elements or give a warning.

Patented May 11, 1971

Inventor
KEN-ICHIRO KURITA

By
McCarthy, Depaoli & O'Brien
Attorneys

Inventor
KEN-ICHIRO KURITA

By
McCarthy, ... & O'Brien
Attorneys

APPARATUS FOR DETECTING INCLINATION OF FILTER PLATES IN TRANSIT

BACKGROUND OF THE INVENTION

The present invention relates to a safety apparatus for a filter press which is adapted to automatically stop the transport of a filter plate or filter frame or to indicate a warning when one filter plate or filter frame is moved at different speeds at opposite sides thereof and thereby inclined beyond a certain limit from the proper position at right angle with the transport direction while it is being sent forward by transport means provided on the opposite sides thereof.

In a filter press comprising a group of filter plates movably supported on side bars by the handles fixed to the opposite sides of the filter plates, filtering elements are released from one another or brought together prior to or after filtration. On such occasion, the opposite sides of each filter plate is moved the same distance at the same speed in normal operation but there arises a situation in which one handle on a filter plate precedes the other handle to incline the filter plate, resulting in the derailment of the plate and troubles in the drive system.

SUMMARY OF THE INVENTION

A primary object of the present invention is to provide an apparatus which is capable of automatically halting the movement of a filter plate or giving a warning when the filter plate is moved at different speeds at opposite sides thereof and thereby inclined beyond a predetermined extent.

Another object of the present invention is to provide an apparatus by which when a filter plate or filter frame is inclined beyond a predetermined degree while it is being transported, such inclination is detected to halt the movement of the filter plate or frame or to give a warning.

In accordance with a mode of the present invention, the apparatus is provided with a projector at least at one side of a group of filter plates and a light intercepting plate attached to each of the filter plate and adapted to permit the light beam to reach a light receiver when the filter plates are sent forward in proper position and to prevent the light beam from entering the receiver when one filter plate is moved at different speeds at opposite sides thereof and inclined beyond the predetermined degree, the apparatus thus being capable of electrically stopping the movement of the filter plate or filter frame or of giving a warning when it is inclined beyond a predetermined degree while it is being sent forward.

Another embodiment of the present invention comprises a lead wire provided at least along one side of a group of filter plates and insulated from the base frame and contact members provided on the filter plates or filter frames, a very low voltage being applied to the lead wire, the structure being such that when one filter plate or filter frame is moved at different speeds at opposite sides thereof and inclined beyond a predetermined degree the lead wire is brought into contact with the contact members to ground the current so as to halt the movement of the filter plate electrically or to give a warning.

The present invention is further characterized in that the apparatus comprises a wire rope stretched at least along one side of a group of filter plates with suitable tension and fixed to the stationary portions at opposite ends of the filter press, guide members mounted on each of the filter plates, and a limit switch provided at least at one of the stationary portions, the structure being such that when a filter plate or filter frame is moved at different speeds at opposite sides thereof and inclined beyond a predetermined degree to bend the wire rope by the guide members, the limit switch is actuated by the longitudinal pulling force resulting from the bending of the wire rope so as to halt the movement of filter plates electrically or to give a warning.

The present invention is thus capable of preventing derailment of the filter plates or frames off the side bars of the filter press and troubles in the drive system which are attributable to the inclination of the filtering elements, and such operation to ensure safety can be achieved with provision of a relatively simple structure.

DESCRIPTION OF THE PREFERRED EMBODIMENTS

Figure 1:
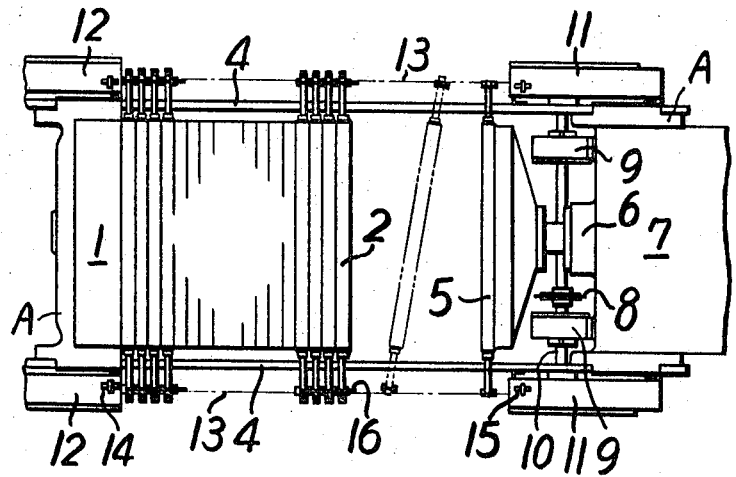
FIG. 1 is a plan view showing a filter press provided with an apparatus in accordance with the present invention.
Figure 2:
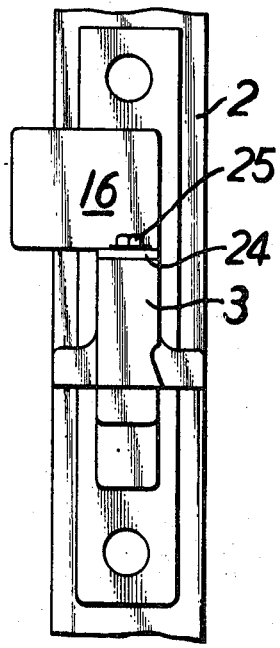
FIG. 2 is a side elevation showing the principal part of a filter plate.
Figure 3:
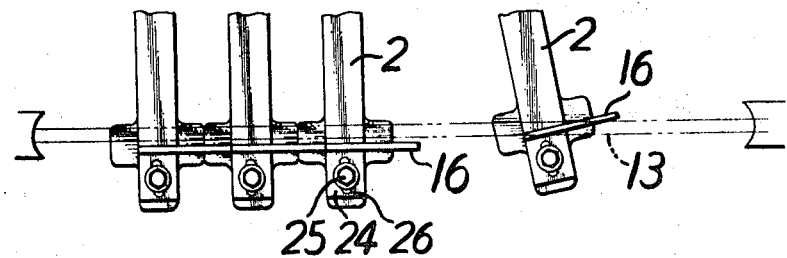
FIG. 3 is a plan view showing the principal parts of the filter plates.

Referring to the embodiment in FIG. 1, designated at 1 is a stationary end plate and at 2 are filter plates. Each of the filter plates 2 is provided, at opposite sides, with handles 3 which are respectively mounted on two parallel side bars 4, in movable manner, the filter plates 2 thereby being supported on the two side bars. Indicated at 5 is a movable end plate and a plurality of the filter plates 2 are disposed between the stationary end plate 1 and the movable end plate 5. The movable end plate 5 supported on the side bars 4 by means of handles in the same manner as the filter plates 2 is adapted to be moved backward or forward by a cylinder 6 disposed at the end of a machine frame A as already known. Designated at 7 is a cover for a drive motor and reduction means. A sprocket 8 is fixed to a drive shaft 10 supported on a pair of bearings 9 and provided with drive sprockets (not shown) at its opposite ends. The sprockets 8 is driven by the drive motor through the reduction means. Indicated at 11 are covers for the drive sprockets and at 12 covers for driven sprockets. The filter plates 2 are driven by a pair of chains 13 in engagement with two sets of drive sprockets and driven sprockets (not shown). Since this structure is already known, further explanation will be omitted.

Projectors 14 are positioned on the opposite sides of the stationary end plate 1 and light receivers 15 are disposed behind the movable end plate 5 on the opposite sides thereof. A light intercepting plate 16 is attached to the handle 3 of the filter plate 2 in such manner that its position is adjustable. When the filter plate 2 is moved forward in normal position, a beam of light emitted from the projector 14 enters the light receiver 15, but if the filter plate 2 is moved only at one side and thereby inclined beyond a certain limit, the light intercepting plate 16 prevents the light beam from striking the receiver 15. By means of a bolt 25 the light intercepting plate 16 is secured to the upper face of the handle 3 at a holding portion 24 projecting from its lower part in L-shaped form. Designated at 26 is a fixing hole which, being formed in slot shape in the holding portion 24, provides play for the bolt 25. Within the range of play, the position to secured the light intercepting plate 16 can be adjusted. The projector 14 is attached to the cover 12 of the driven sprocket and the light receiver 15 to the cover 11 of the drive sprocket. When the filter plate 2 is in normal position, the light intercepting plate 16 is disposed parallel and proximate to the light beam projected from the projector 14. Provided that the filter plate 2 is transported in normal position the beam of light projected from the projector 14 strikes straight on the light receiver 15, but if the filter plate 2 is moved at different speeds at opposite sides thereof and inclined to some extent as indicated in chain line in FIG. 1, the beam of light is intercepted by the plate 16 and does not reach the receiver 15. In the case where a switch for the electric circuit of the motor for transporting filter plates is adapted to function is response to such optical variation, transport of the filter plates 2 can be halted or warning can be indicated. Since an already known structure can be employed in effecting such operation, illustration will not be given.

Figure 4:
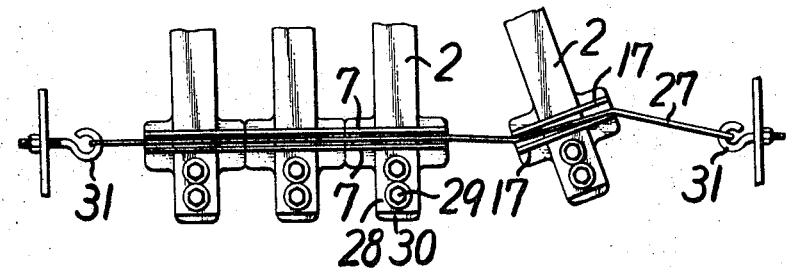
FIG. 4 is an enlarged plan view showing the principal part of another embodiment of the present invention.
Figure 5:
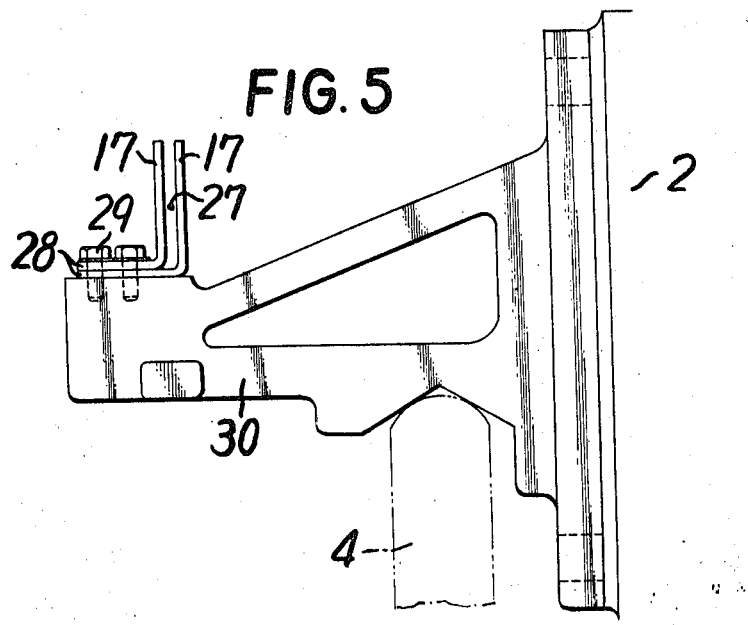
FIG. 5 is a front view of the embodiment in FIG. 4.

As an equivalent of the light beam in an embodiment in FIGS. 1 to 4, the embodiment in FIG. 4 employs a lead wire 27 extending in the transport direction of the filter plates 2 and insulated from the machine frame A. A low voltage is applied to the lead wire 27 and each of the filter plates 2 is provided with contact members 17 which are disposed in such arrangement that when the filter plate 2 is inclined beyond a predetermined limit the contact members 17 come into contact with the lead wire 27. Thus, when the filter plate 2 is moved at one side to being the lead wire 27 into contact with the contact members 17, current transfers to the contact members to operate the elements in an electric circuit (not shown), which further act to halt the operation of the drive motor or function a warning device such as a warning lamp or warning bell. The contact members 17 are provided in a pair on the opposite sides of the lead wire 27 so as to enable the lead wire 27 to come into contact with the contact members 17 without failure when the filter plate is inclined. The contact members 17 are fixed, for instance, to the handle 30 by bolts 29 with one of the holding portions thereof laid on the other. Designated at 31 are holders for providing the lead wire 27 which are fixed to the covers of drive sprocket and driven sprocket as in the embodiment in FIG. 1. The machine frame A, being of the same structure as in the foregoing embodiment, is not shown.

Figure 6:
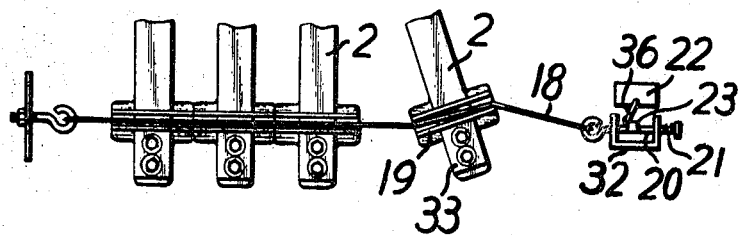
FIG. 6 is a plan view showing still another embodiment of the present invention.
Figure 7:
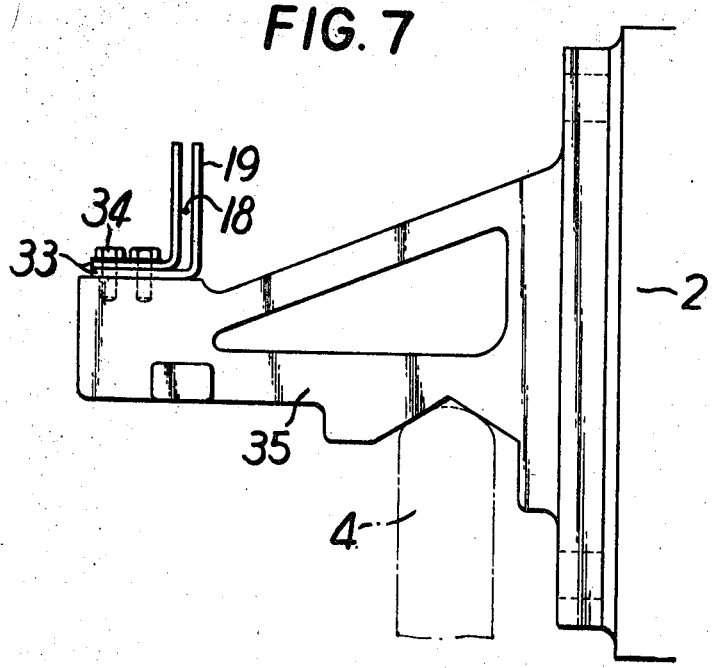
FIG. 7 is a front view of the embodiment in FIG. 6.

The embodiment in FIG. 6 is based upon the principle that the length of the lead wire or like material in the embodiment above is shortened as it is bent. A wire rope 18 with suitable tension is disposed at least at one side of a group of filter plates 2 each of which carries contact members 19. The wire rope 18 is fixed to stationary portions at both ends of the filter press. At least one of the stationary portions has a limit switch 22 which is adapted to be operated when the filter plate 2 is inclined beyond a predetermined limit and the wire rope 18 is therefore bent by the contact members 19, the structure being such that the wire rope 18 thus moved and shortened in the longitudinal direction actuates the limit switch 22. The wire rope 18 passes between the contact members 19 mounted on the handles 3 on the respective filter plates 2, with the opposite ends fixed to stationary portions of the filter press, for example, to the covers of driven sprocket and drive sprocket. One of the wire rope holders 20 passes through a support frame 32 which is secured to the stationary part of the filter press, for example to the cover of the drive sprocket. A spring 21 is disposed between the support frame 32 and the end of the holder 20 to impart moderate tension to the wire rope 18. The wire rope 18 has a projection 23 for operating the limit switch 22. The contact members 19 made of L-shaped plates are attached, for example, to the handle 35 by bolts 34 with one of holder portions 33 lying on the other. Since the machine frame is of the same structure as in the embodiment in FIG. 1, the description is omitted.

When the filter plates 2 are transported in normal state, the wire rope 18, being free from external force, does not actuate the limit switch 22, whereas when the filter plate 2 is moved at different speeds at opposite sides and inclined to a certain extent, the wire rope 18 bent by the contact members 19 pulls the holder 20, so that the projection 23 pushes an actuating member 36 of the limit switch 22. As a result, the limit switch 22 is actuated to open the switch in the electric circuit of the drive motor and halts the motor or functions a warning device such as a warning lamp or warning bell.

Although the inclination of the filter plates 2 during transit is more likely to take place in systems chain drive, screw drive systems are not perfectly free from such trouble, so that the present invention is applicable to both types of drive systems. While the drawings show the apparatus provided on the both sides of the group of filter plates, intended object can be fulfilled also in the case where the apparatus is disposed only at one side of the group of filter plates.

I claim:

1. In a filter press provided with a group of filtering elements having a support means on each side thereof between a stationary end plate and a movable end plate adapted to be moved horizontally, the group of said filtering elements being provided with transport means for releasing said filtering elements by a predetermined space and adapted to press filter cloth adjacent to each of said filtering elements when compressed by a movable end plate for filtering operation, an apparatus for detecting inclination of filter plates in transit comprising detecting means disposed at least at one side of a group of filtering elements and provided with linearity parallel to the direction of movement of said filtering elements and blocking means mounted on each of said filtering elements in corresponding relationship with said detecting means, said blocking means being adapted to be detected by said detecting means when at least one of said filtering elements is inclined during transit.

2. The apparatus for detecting inclination of filter plates in transit as claimed in claim 1 wherein said detecting means comprises a projector and a light receiver disposed on stationary members of the filter press and a light intercepting plate serving as said blocking means is adjustably mounted on a side portion of each of said filtering elements, said light intercepting plate being positioned in parallel with the path of light between said projector and said light receiver.

3. The apparatus for detecting inclination of filter plates in transit as claimed in claim 1 wherein said detecting means comprises an electrical lead wire extending between stationary members of the filter press and two contact plates serving as said blocking means are mounted on a side portion of each of said filtering elements, said lead wire being passed between said two contact plates.

4. The apparatus for detecting inclination of filter plates in transit as claimed in claim 1 wherein said detecting means comprises a wire rope extending between stationary members of the filter press and loaded with a spring at one end thereof, the spring-loaded end of said wire rope being provided with a projection for actuating a limit switch, two contact plates serving as said blocking means and being mounted on a side portion of each of said filtering elements to pass said lead wire therebetween.